(12) United States Patent
Alward et al.

(10) Patent No.: US 7,578,979 B2
(45) Date of Patent: *__Aug. 25, 2009__

(54) CERAMIC DIESEL EXHAUST FILTERS

(75) Inventors: Gordon S. Alward, Palm Desert, CA (US); Robert A. DiChiara, Jr., Carlsbad, CA (US)

(73) Assignee: GEO2 Technologies, Inc., Woburn, MA (US)

( * ) Notice: Subject to any disclaimer, the term of this patent is extended or adjusted under 35 U.S.C. 154(b) by 757 days.

This patent is subject to a terminal disclaimer.

(21) Appl. No.: 11/008,787

(22) Filed: Dec. 10, 2004

(65) Prior Publication Data

US 2005/0191218 A1     Sep. 1, 2005

Related U.S. Application Data

(63) Continuation of application No. 10/281,179, filed on Oct. 28, 2002, now Pat. No. 6,946,013.

(51) Int. Cl.
*B01D 50/00* (2006.01)
*B01D 39/06* (2006.01)

(52) U.S. Cl. .......................................... 422/180; 55/523

(58) Field of Classification Search ................ 422/177, 422/180, 777; 55/282.2, 523; 60/311; 423/213.5; 428/116
See application file for complete search history.

(56) References Cited

U.S. PATENT DOCUMENTS 3,549,473 A    12/1970  Le Blanc et al.
3,929,671 A    12/1975  Nakamura et al.
3,956,185 A    5/1976   Yagi et al.
4,047,965 A    9/1977   Karst et al.
4,195,063 A    3/1980   Iwaoka et al.
4,206,177 A    6/1980   Otsubo et al.
4,239,733 A    12/1980  Foster et al.
4,276,071 A    6/1981   Outland (Continued)

FOREIGN PATENT DOCUMENTS

EP           473715          3/1992

(Continued)

OTHER PUBLICATIONS

Olson, J "Diesel Emission Control Devices—Design Factors Affecting Mounting Mat Selection", *SAE Technical Paper Series*, No. 2004-01-1420, 2004 SAE World Congress, Mar. 8-11, 2004,1-8.

(Continued)

*Primary Examiner*—Tom Duong

(57) ABSTRACT

An improved, efficient, and regenerable exhaust emission filter and filter system are provided which incorporate the use of an inorganic, non-woven fiber filter element. The filter is able to capture exhaust pollutants and particulates through the interwoven nature of the filter element and due to area enhancements applied to the filter element including microscopic enhancements. The filter has an improved life and is able to combust a greater percentage of trapped particulates due to the high temperatures the filter element can withstand. The filter element if formed from a non-woven fiber block which is machined or shaped into a filter foundation. The filter element can have a multitude of coatings and catalysts applied and can be wrapped in insulation and a casing. The improved exhaust emission filter is particularly useful for diesel engine exhausts.

30 Claims, 8 Drawing Sheets

U.S. PATENT DOCUMENTS

| | | |
|---|---|---|
| 4,290,501 A | 9/1981 | Tanaka |
| 4,297,328 A | 10/1981 | Ritscher et al. |
| 4,319,556 A | 3/1982 | Schwartz et al. |
| 4,324,572 A | 4/1982 | Erdmannsdorfer et al. |
| 4,329,162 A | 5/1982 | Pitcher, Jr. |
| 4,335,023 A | 6/1982 | Dettling et al. |
| 4,343,074 A | 8/1982 | Bailey et al. |
| 4,345,430 A | 8/1982 | Pallo et al. |
| 4,348,362 A | 9/1982 | Foss |
| 4,358,480 A | 11/1982 | Ecord et al. |
| 4,379,109 A | 4/1983 | Simpson |
| 4,398,931 A | 8/1983 | Shevlin |
| 4,404,992 A | 9/1983 | Sasaki et al. |
| 4,410,427 A | 10/1983 | Wydeven |
| 4,415,342 A | 11/1983 | Foss |
| 4,416,676 A | 11/1983 | Montierth |
| 4,417,908 A | 11/1983 | Pitcher, Jr. |
| 4,427,418 A | 1/1984 | Kogiso et al. |
| 4,456,457 A | 6/1984 | Nozawa et al. |
| 4,457,895 A | 7/1984 | Prigent |
| 4,508,256 A | 4/1985 | Radel et al. |
| 4,529,718 A | 7/1985 | Dupin |
| 4,550,034 A | 10/1985 | Shimrock et al. |
| 4,584,003 A | 4/1986 | Oda et al. |
| 4,609,563 A | 9/1986 | Shimrock et al. |
| 4,650,775 A | 3/1987 | Hill |
| 4,652,286 A | 3/1987 | Kusuda et al. |
| 4,696,711 A | 9/1987 | Greszczuk |
| 4,710,487 A | 12/1987 | Koch |
| 4,711,009 A | 12/1987 | Cornelison et al. |
| 4,722,920 A | 2/1988 | Kimura et al. |
| 4,732,593 A | 3/1988 | Kondo et al. |
| 4,735,756 A | 4/1988 | Rausch |
| 4,737,326 A | 4/1988 | Wirth et al. |
| 4,749,671 A | 6/1988 | Saito et al. |
| 4,761,323 A | 8/1988 | Muhlratzer et al. |
| 4,828,774 A | 5/1989 | Andersson et al. |
| 4,849,399 A | 7/1989 | Joy, III et al. |
| 4,900,517 A | 2/1990 | Domesle et al. |
| 4,915,981 A | 4/1990 | Traskos et al. |
| 4,916,897 A | 4/1990 | Hayashi et al. |
| 4,929,429 A | 5/1990 | Merry |
| 4,934,142 A | 6/1990 | Hayashi et al. |
| 4,935,178 A | 6/1990 | Esposito et al. |
| 4,955,164 A | 9/1990 | Hashish et al. |
| 4,970,035 A | 11/1990 | Baarsch |
| 4,976,760 A | 12/1990 | Helferich et al. |
| 4,976,929 A | 12/1990 | Cornelison et al. |
| 5,009,857 A | 4/1991 | Haerle |
| 5,015,610 A | 5/1991 | Dwivedi |
| 5,021,369 A | 6/1991 | Ackerman et al. |
| 5,024,979 A | 6/1991 | Debaig-Valade et al. |
| 5,028,397 A | 7/1991 | Merry |
| 5,053,062 A | 10/1991 | Barris et al. |
| 5,066,432 A | 11/1991 | Gabathuler et al. |
| 5,075,160 A | 12/1991 | Stinton et al. |
| 5,079,082 A | 1/1992 | Leiser et al. |
| 5,087,272 A | 2/1992 | Nixdorf |
| 5,100,632 A | 3/1992 | Dettling et al. |
| 5,102,639 A | 4/1992 | Chou et al. |
| 5,154,894 A | 10/1992 | MacFarlane et al. |
| 5,154,901 A | 10/1992 | Yoshida et al. |
| 5,171,341 A | 12/1992 | Merry |
| 5,179,061 A | 1/1993 | Haerle |
| 5,180,409 A | 1/1993 | Fischer |
| 5,182,249 A | 1/1993 | Wang et al. |
| 5,194,078 A | 3/1993 | Yonemura et al. |
| 5,196,120 A | 3/1993 | White |
| 5,248,481 A | 9/1993 | Bloom et al. |
| 5,248,482 A | 9/1993 | Bloom |
| 5,250,094 A | 10/1993 | Chung et al. |
| 5,258,164 A | 11/1993 | Bloom et al. |
| 5,260,125 A * | 11/1993 | Copes .................. 442/72 |
| 5,262,129 A | 11/1993 | Terada et al. |
| 5,272,125 A | 12/1993 | Weible et al. |
| 5,279,737 A | 1/1994 | Sekhar et al. |
| 5,290,350 A | 3/1994 | Besnard et al. |
| 5,296,198 A * | 3/1994 | Abe et al. .................. 422/180 |
| 5,296,288 A | 3/1994 | Kourtides et al. |
| 5,298,046 A * | 3/1994 | Peisert .................. 55/486 |
| 5,376,598 A | 12/1994 | Preedy et al. |
| 5,378,142 A | 1/1995 | Kennelly et al. |
| 5,380,580 A | 1/1995 | Rogers et al. |
| 5,429,780 A | 7/1995 | Prin et al. |
| 5,436,216 A | 7/1995 | Toyao et al. |
| 5,453,116 A | 9/1995 | Fischer et al. |
| 5,497,620 A | 3/1996 | Stobbe |
| 5,504,281 A | 4/1996 | Whitney et al. |
| 5,551,239 A | 9/1996 | Feeley et al. |
| 5,567,536 A | 10/1996 | Lintz et al. |
| 5,611,832 A | 3/1997 | Suzuki et al. |
| 5,618,500 A | 4/1997 | Wang |
| 5,629,186 A | 5/1997 | Yasukawa et al. |
| 5,687,787 A | 11/1997 | Atmur et al. |
| 5,692,373 A | 12/1997 | Atmur et al. |
| 5,702,761 A | 12/1997 | DiChiara et al. |
| 5,780,126 A | 7/1998 | Smith et al. |
| 5,827,577 A | 10/1998 | Spencer |
| 5,844,200 A | 12/1998 | Leader et al. |
| 5,849,375 A | 12/1998 | Smith et al. |
| 5,851,647 A | 12/1998 | Foster |
| 5,879,640 A | 3/1999 | Atmur et al. |
| 5,910,095 A | 6/1999 | Strasser et al. |
| 5,914,187 A | 6/1999 | Naruse et al. |
| 5,925,156 A | 7/1999 | Motoki et al. |
| 5,943,857 A | 8/1999 | Ansell et al. |
| 5,948,146 A | 9/1999 | Thomaides et al. |
| 5,983,631 A | 11/1999 | Mineo |
| 6,077,600 A | 6/2000 | Atmur et al. |
| 6,090,744 A | 7/2000 | Koda et al. |
| 6,156,698 A | 12/2000 | Iida et al. |
| 6,171,556 B1 | 1/2001 | Burk et al. |
| 6,200,523 B1 | 3/2001 | Quick et al. |
| 6,210,786 B1 | 4/2001 | Atmur et al. |
| 6,237,587 B1 | 5/2001 | Sparling et al. |
| 6,238,467 B1 | 5/2001 | Azarian et al. |
| 6,238,618 B1 | 5/2001 | Brundage et al. |
| 6,284,201 B1 | 9/2001 | Buck |
| 6,341,662 B1 | 1/2002 | Karlsson |
| 6,355,080 B1 | 3/2002 | Dullien |
| 6,365,092 B1 | 4/2002 | Backa et al. |
| 6,440,192 B2 | 8/2002 | Guerin et al. |
| 6,444,006 B1 | 9/2002 | Haberkamp et al. |
| 6,479,104 B1 | 11/2002 | DiChiara, Jr. et al. |
| 6,502,289 B1 | 1/2003 | Kane et al. |
| 6,521,321 B2 | 2/2003 | Kahlbaugh et al. |
| 6,576,200 B1 | 6/2003 | Yamamoto et al. |
| 6,604,604 B1 | 8/2003 | Badeau et al. |
| 6,605,259 B1 | 8/2003 | Henry |
| 6,613,255 B2 | 9/2003 | Dichiara |
| 6,622,482 B2 | 9/2003 | Knight et al. |
| 6,652,950 B2 | 11/2003 | Barney et al. |
| 6,660,115 B2 | 12/2003 | Butler et al. |
| 6,667,012 B1 | 12/2003 | Anand et al. |
| 6,669,913 B1 | 12/2003 | Haberkamp |
| 6,673,136 B2 | 1/2004 | Gillingham et al. |
| 6,673,414 B2 | 1/2004 | Ketcham et al. |
| 6,682,706 B1 | 1/2004 | Yamamoto et al. |
| 6,685,889 B1 | 2/2004 | Raftery et al. |
| 6,692,712 B1 | 2/2004 | Andersen |
| 6,699,342 B2 | 3/2004 | DiChiara, Jr. |
| 6,800,107 B2 | 10/2004 | Ishihara et al. |
| 6,916,450 B2 | 7/2005 | Akama et al. |
| 2002/0149128 A1 | 10/2002 | DiChiara, Jr. |

| | | |
|---|---|---|
| 2002/0157358 A1 | 10/2002 | Noda et al. |
| 2002/0192512 A1 | 12/2002 | DiChiara, Jr. et al. |
| 2003/0022783 A1 | 1/2003 | DiChiara, Jr. |
| 2003/0032545 A1 | 2/2003 | DiChiara, Jr. |
| 2003/0082414 A1 | 5/2003 | DiChiara, Jr. et al. |
| 2003/0138585 A1 | 7/2003 | DiChiara, Jr. |
| 2003/0205310 A1 | 11/2003 | DiChiara, Jr. |
| 2007/0289275 A1 | 12/2007 | Ohno et al. |

FOREIGN PATENT DOCUMENTS

| | | |
|---|---|---|
| EP | 830201 | 3/1998 |
| WO | WO-90/14224 | 11/1990 |

OTHER PUBLICATIONS

Graves, "Review of Diesel Exhaust Aftertreatment Programs", *SAE Technical Paper Series* No. 1999-01-2245, (1999).

Ichikawa, et al., "Material Development of High Porous SiC for Catalyzed Diesel Particulate Filters", *SAE Technical Paper Series*, No. 2002-01-0380, (2003).

Merkel, et al., "Thermal Durability of Wall-Flow Ceramic Diesel Particulate Filters", *SAE Technical Paper Series*, No. 2001-01-0190, (2001).

Cutler, et al., "A New High Temperature Ceramic Material for Diesel Particulate Filter Applications", *SAE Technical Paper Series*, No. 2001-01-2844, (2000).

Ohno, et al., "Characterization of SiC-DPF for Passenger Car", *SAE Technical Paper Series*, No. 2000-01-0185, (2000).

Cutler, et al., "Mechanical Durability of Cordierite-Based NOx Adsorber/Catalyst Systems for Lean Burn Gasoline Applications", *SAE Technical Paper Series*, No. 1999-01-3500, (1999).

Barataud, et al., "Diesel Particulate Filter Optimization", *SAE Technical Paper Series*, No. 2003-01-0376, (2003).

Dou, et al., "A Systematic Investigation of Parameters Affecting Diesel NOx Adsorber Catalyst Performance", *US DOE*, 8th Diesel Emissions Reduction Conference (DEER), San Diego, CA, available at http://www.orau.gov/deer/DEER2002/Session11/dou.pdf.., (2002).

Gulati, "Ceramic Catalyst Supports and Filters for Diesel Exhaust Aftertreatment", *Structural Catalysts and Reactors*, A. Cybulski, ed., M. Dekker, New York,(1998),501-41.

Gulati, "Ceramic Catalyst Supports for Gasoline Fuel", *Structural Catalysts and Reactors*, A. Cybulski, ed., M. Dekker, New York,(1998),15-58.

Held, et al., "Improved Cell Design for Increased Catalytic Conversion Efficiency", *SAE Technical Paper Series*, No. 940932, (1994).

Johnson, "Diesel Emission Control Technology-2003 in Review", *SAE Technical Paper Series*, No. 2004-01-0070, (2004).

Li, et al., "Properties and Performance of Diesel Particulate Filters of an Advanced Ceramic Material", *SAE Technical Paper Series*, No. 2004-01-0955, (2004).

Masoudi, et al., "Predicting Pressure Drop of Wall-Flow Diesel Particulate Filters—Theory and Experiment", *SAE Technical Paper Series*, No. 2000-01-0184, (2000).

Miller, et al., "Design, Development and Performance of a Composite Diesel Particulate Filter", *SAE Technical Paper Series*, No. 2002-01-0323, (2002).

Miyakawa, et al., "Characteristics and Evaluation of Porous Silicon Nitride DPF", *SAE Technical Paper Series*, No. 2003-01-0386, (2003).

Murtagh, et al., "Development of a Diesel Particulate Filter Composition and Its Effect on Thermal Durability and Filtration Performance", *SAE Technical Paper Series*, No. 940235, (1994).

Nakatani, et al., "Simultaneous PM and NOx Reduction System for Diesel Engines", *SAE Technical Paper Series*, No. 2002-01-0957, (2002).

Ogyu, et al., "Characterization of Thin Wall SiC-DPF", *SAE Technical Paper Series*, No. 2003-01-0377, (2003).

Suresh, et al., "An Experimental and Modeling Study of Cordierite Traps—Pressure Drop and Permeability of Clean and Particulate Loaded Traps", *SAE Technical Paper Series*, No. 2000-01-0476, (2000).

Tan, et al., "A Study on the Regeneration Process in Diesel Particulate Traps Using a Copper Fuel Additive", *SAE Technical Paper Series*, No. 960136, (1996).

Uchida, et al., "Durability Study on SI-SIC Material for DPF", *SAE Technical Paper Series*, No. 2003-01-0384, (2003).

Versaevel, et al., "Some empirical Observations on Diesel Particulate Filter Modeling and Comparison Between Simulations and Experiments", *SAE Technical Paper Series*, No. 2000-01-0477, (2000).

Gulati, Suresh T., "Physical Durability of Thin Wall Ceramic Substrates", *SAE Technical Paper Series* 982635, (Oct. 1998).

* cited by examiner

CERAMIC DIESEL EXHAUST FILTERS

CROSS REFERENCE TO RELATED APPLICATIONS:

This application is a continuation of U.S. application Ser No. 10/281,179, filed Oct. 28, 2002, now U.S. Pat. No. 6,946,013, the entirety of which is hereby incorporated by reference.

This application includes material which is subject to copyright protection. The copyright owner has no objection to the facsimile reproduction of the patent disclosure, as it appears in the Patent and Trademark Office files or records, but otherwise reserves all rights.

FIELD OF THE INVENTION

The present invention relates to the field of exhaust emission filtration. More specifically, this invention relates to a system and/or apparatus for filtering the exhaust emissions of engines.

BACKGROUND OF THE INVENTION

The millions of cars and trucks on the road throughout the world represent a substantial source of air pollution. To minimize pollution, many countries have enacted clean air laws restricting the amount of pollution that vehicles can produce. One method employed by auto manufacturers to reduce such pollution is the use of a catalytic converter which treats the exhaust gases of vehicles to reduce some pollutants. Theoretically, vehicles are designed with an air-to-fuel ratio such that all of the fuel is burned using all of the oxygen in the air within the combustion chamber. However, the ideal air-to-fuel mixture varies during driving. The main emissions of a typical car engine include nitrogen gas, carbon dioxide, and water vapor. The emissions just mentioned are relatively benign. However, the combustion process is never perfect and small amounts of more harmful emissions are also produced. These harmful emissions are a part of the six main pollutants the EPA has identified as "Criteria Pollutants."

The six Criteria Pollutants include: (1) ozone; (2) volatile organic compounds (VOCs); (3) nitrogen dioxide ($NO_2$); (4) carbon monoxide (CO); (5) particulate matter (PM); and (6) sulfur dioxide ($SO_2$). Ozone is created by the chemical reaction of pollutants and includes VOCs and NOx. In addition, ground-level ozone is the principle component of smog. VOCs (volatile organic compounds) are released from burning fuels (gasoline, oil, wood, coal, natural gas, etc.), solvents, paints glues and other products used at work or at home. Automobiles are large contributors to the amount of VOCs pollutants. VOCs also include chemicals such as benzene, toluene, methylene chloride and methyl chloroform. Nitrogen Dioxide ($NO_2$) is one of the NOx pollutants and is a smog-forming chemical. $NO_2$ is created by the burning of gasoline, natural gas, coal, oil, and the like. Automobiles are large contributors to the amount of $NO_2$ pollutants. Carbon Monoxide (CO) is created by the burning of gasoline, natural gas, coal, oil and the like and automobiles are large contributors to the amount of CO pollutants. Particulate Matter (PM)-10 can be dust, smoke, and soot and can be created by the burning of wood, diesel, and other fuels. Industrial plants, agricultural activities such as plowing and burning off fields, and the use of unpaved roads contribute to the amount of PM pollutants. Finally, sulfur dioxide ($SO_2$) is created by the burning of oil, especially high-sulfur coal from the Eastern United States, and through industrial processes (paper, metals).

Often catalytic converters will use catalysts to enhance or aide in the filtering of engine exhausts to reduce the amount of Criteria Pollutants. Typical catalytic converters use two different types of catalysts, a reduction catalyst and an oxidation catalyst. Most catalyst filters consist of a ceramic structure coated or impregnated with a metal catalyst such as platinum, rhodium or paladium. The idea behind a catalyst exhaust filter is to create a structure that exposes the maximum surface area of catalyst to the exhaust stream while minimizing the amount of catalyst required due to the high cost of such catalysts.

As seen in FIG. 1, a prior art catalytic converter 100 includes a reduction catalyst 102 and an oxidation catalyst 104. As exhaust enters the catalytic converter 100 it is filtered and exposed to the reduction catalyst 102. The reduction catalyst 102 typically uses platinum or rhodium to help convert the nitrogen oxides within the emissions to less harmful substances. The nitrogen oxide molecules contact the catalyst which momentarily retains the nitrogen atom freeing the oxygen in the form of $O_2$. The nitrogen atom binds with other nitrogen atoms stuck to the catalyst forming $N_2$.

The exhaust is then treated by the oxidation catalyst 104 which causes unburned hydro-carbons and carbon monoxide to burn further. (The oxidation catalyst aids the reaction of the carbon monoxide (CO) and hydro-carbons with the remaining oxygen in the exhaust gas.) The primary structure of converters is a porous honeycomb having small tubules. FIG. 2 shows an example of a ceramic exhaust filter incorporating a honeycomb catalyst structure.

Diesel engines (where compression alone ignites the fuel) have recently come under worldwide scrutiny for their exhaust emissions which contain a larger number of harmful particulates in addition to toxic gases. Manufacturers' response has been to apply known catalytic converter technology to diesel engines apparently assuming that one solution will work for all types of fossil fuel pollution. Unfortunately, regulations regarding emission standards have exceeded the physical and economic limits of conventional catalytic-converter technology. Diesel emissions are different than gasoline emissions, especially in the greater amount of particulate matter generated. For these reasons, existing technology for exhaust emission capture, combustion, and oxidation will not comply with the increased diesel engine emission standards required.

Commercial solutions which have been developed to meet these new diesel engine emission standards can be categorized into two viable groups: (1) conventional monolithic catalytic converters with a honeycomb configuration; and (2) inorganic fiber cartridges. It is commonly known that particulate matter, in the form of exhaust emission of unburned hydrocarbons, needs to be captured and completely combusted or burned. This capture is accomplished by placing a porous septum in the path of the exiting emission which allows the particulate matter to bond or adhere to the septum through surface tension. The porous septum also permits the accompanying gases to pass through the pores as unrestricted as possible. The septum is likened to a spider web laid out to capture flying insects.

Once the particulate matter is captured, the particulate needs to be completely combusted or burned by raising the particulates temperature in an oxidizing environment. Combustion of the particulates can be accomplished by utilizing the existing temperature of the exiting exhaust and/or providing an auxiliary source of heat. A known problem is that the temperature required to accomplish combustion must also have the particulate matter reside on the septum surface for a length of time. This period of time is called residence time.

FIG. 2 provides a graph of the residence time required to combust or burn particulate matter (soot mass) at various temperatures. As seen in FIG. 2, the residence time to combust or burn soot mass having a 0.9 soot mass at 600 degrees (Kelvin) is much longer than the residence time at 1200 degrees. The longer the residence time, the smaller the allowable through put volumes and the greater the risk of more particulate accumulating on and clogging the septum pores. Clogging can also be a result of the ceramic material overheating to the point of melting thereby blocking or clogging the septum pores. In order to prevent clogging, obstruction or saturation more surface area is required. A useable solution must consider which temperature: (1) provides the lowest residence time; (2) is safest from thermal harm; (3) uses a minimal amount of auxiliary energy; and (4) is inexpensive to produce. Increasing temperature requires additional energy. Further, certain amounts of the energy source are conducted, drawn, or channeled away by coming in contact with a material through thermal conductivity. The chemistry of different substances determines the level of thermal conductivity. Additionally, the thermal conductivity of the filter medium determines the efficiency of the exhaust emission filter. A low thermal conductivity is preferred because more of the heat energy generated is reflected back, and will remain in the pore space if the solid portion of the filter does not conduct or channel heat away. The lower the thermal conductivity, the lower the loss of heat. Lower heat loss translates into less energy needed to obtain the desired temperature range for catalytic conversion and higher energy efficiency.

Since all materials have some level of thermal conductivity, it is preferable to minimize this effect. Conductivity minimization can be accomplished by choosing a material with a lower conductivity or by using less of the material.

As previously discussed in conjunction with FIG. 2, a higher temperature permits the particulate matter to combust with a shorter residence time and therefore, increased heat is preferred. Moving the filter closer to the combustion chamber or engine or adding an auxiliary heat source can provide increased heat. However, conventional catalytic converter filter elements cannot withstand the high temperatures and increased vibrational shock present in such locations. In addition, some catalysts applied to conventional filter elements will work less efficiently or even cease to function at high temperatures (i.e. above 500° C.). Therefore, what is needed is a filter element which can be placed in extremely high temperatures (i.e. above 500° C.), such as near the combustion chamber, is more resistant to vibration degradation, and still has the same or an increased particulate matter burning effect. The ability to achieve the same particulate matter burning effect without a catalyst will also provide significant savings on catalyst and coating costs.

Further, the addition of an oxidation catalyst coating applied to the filter can provide the same combustion and oxidation effect at a lower and more reasonable temperature. As previously mentioned, metal oxidation catalysts such as platinum, palladium, or rhodium are preferred. The end result is that catalytic coatings lower the hydrocarbon combustion temperature range allowing a more flexible and reasonable distance between the filter and the engine.

The features needed for providing an improved exhaust emission system includes filter with a minimum a mass and maximum surface area. Additional features which directly influence and determine the primary features are thermal conductivity, thermal expansion, thermal shock, vibrational shock, stress tolerance, porosity, permeability, weight, cost to produce, ease of manufacture, durability, as well as others.

As seen in FIG. 3, in order to increase the surface area for these catalytic converters a honeycomb configuration 302 or structure is formed within the ceramic filter element 300. The honeycomb structure 302 is formed using an extrusion process in which long tubes with their major axis parallel to the extrusion action are created. The opening of these tubes faces the incoming exhaust airflow. As the emissions enter the tube the particulate will deposit along the interior septum of the tubes. The honeycomb configuration 302 substantially increases the surface area permitting more particulate to be deposited in less volume.

In the internal combustion emission-filtering market the automobile or gasoline engine catalytic converter is the dominant technology. Existing catalytic converter technology is primarily based on a high temperature ceramic, such as cordierite ($2MgO-2Al_2O_3-5SiO_2$) or silicon carbide (SiC). These ceramics are usually extruded into a honeycomb pattern from slurry and then heat-cured into the rigid form of the extrusion. There are physical limits to either cordierite or silicon carbide. Additionally, continued refining of the extrusion process to produce a thinner septum, from 0.6-1.0 mm to 0.2-0.4 mm, has reduced the mass. After over thirty years of refinement, the extrusion process has achieved near physical limits for economic catalytic applications.

Cordierite has been used throughout most of the automobile industry's catalytic converter history and it worked well during the early phase of automotive pollution control. However, with new and stricter regulations enacted worldwide, cordierite in its current configuration cannot provide sufficient emission control. The honeycomb septums are as thin as can be economically extruded. Chemically, the ceramic density has been reduced from 60% plus to the low 40 percentile. In order for these filters to accommodate the increased volume of particulate generated by a diesel engine, the filter sizes have to increase, which adds to vehicle weight, manufacturing costs and operating costs. The percentage of particulate captured with cordierite filters is around 73%, but it continually declines over time due to clogging. At the beginning of the filter's life, the ceramic is 100% clean but the remaining 27% of particulate not captured will build up on the septum walls and the filter will eventually fail to operate. Failure of the filter takes approximately 100,000 miles which coincides with the manufacturer's; recommended filter replacement schedule.

In some instances, cordierite is being replaced by silicon carbide since it has superior heat resistance. Compression ignition engine exhaust temperatures can be greater than that of spark ignition and thus the higher operating temperatures make silicon carbide preferable to cordierite for diesel engines. Cordierite begins to decompose at approximately 1,400 degrees C. while silicon carbide can withstand temperatures up to approximately 2,000 degrees C. However, silicon carbide has a greater thermal expansion and is more costly. Silicon carbide is also much heavier than cordierite and any additional weight is detrimental to vehicle performance. Silicon carbide catalytic converters can be chemically modified to increase porosity through the addition of inorganic fibers. The end result is a minor improvement in particulate filtering of approximately 80%, which translates into a filter life of about 120,000 miles before requiring filter replacement.

Both cordierite and silicon carbide filters have a poor resistance to vibrational and thermal shock. As such, these filters cannot be placed immediately next to or inside an engine exhaust manifold, which is the best location to take advantage of the in situ high temperatures before the temperature decreases due to radiant cooling from the high thermal conducting properties of the exhaust pipe material. Engine vibration and the quick change in temperatures that exist near and within the exhaust manifold would cause the filter material to fatigue and dramatically shorten the life of the filters resulting in filter failure.

The extrusion process used to create the filters also restricts the filter shapes used to near cylindrical bodies formed along the major axis of the extrusion. The shape limitation has not been an issue with previous emission standards. However, the need to design filters to reach near-zero emissions performance may require non-linear and/or non-cylindrical filter design and vehicle integration.

The inorganic fiber cartridges evolved from fossil fuel energy plant filter systems. Energy plants, in particular coal-burning plants, generate large quantities of particulate matter. Particulates are removed by passing the emissions through a series of tubes sealed at one end and wrapped in layers of inorganic fiber. These wrapped tubes are referred to as cartridges. In some instances, the wrapped tubes are referred to as candle filters because of their visual similarity to candles. These are effective when they are in a stationary, open environment with no requirement for small space configuration, and safety from the heat is a minor requirement.

The basic functionality of the cartridge is to direct the exhaust emissions into a series of tubes with one end blocked off Each tube is perforated and the tube exterior is covered with layers of inorganic fibers. The inorganic fibers are secured to the outside of the tube by wrapping yarn or fabric forms of the fiber around the tube. The wound fiber material is secured and made rigid with an inorganic binder and then heat cured.

Several of the cartridges are placed in a cluster with their major axis' parallel to each other. The major axis of the stack is placed perpendicular to the exhaust emission gas flow forcing the gases to enter into and pass through the inside of the tube and exit then through the fiber covering as exhaust. Scaling down a large candle filter into a vehicle exhaust cartridge configuration offers considerable challenges. First, the creation of these filter cartridges is very labor intensive, expensive to build, and to install. Second, the intolerance to vibrational shock in a mobile environment can produce fatigue over time from all of the various interactions of parts, such as plates, tubes, screws, and mounting brackets for each cartridge. Additionally, the interaction of the cartridges against each other in the filter assembly produces fatigue and failure. Third, the end product would still remain relatively large and has definite limitations to scaling down. Fourth, the surface area is essentially equal to or less than traditional catalytic converters. Fifth, the weight is heavy from all of the different parts. Finally, the amount of particulates trapped and combusted and the residence time required does not provide significant improvement in filtration and performance. Overall, a system which uses inorganic fiber cartridges for engine exhaust filtering is too convoluted and complicated to be economically successful in automobiles. However, the use of inorganic fibers does have positive properties. For example, the thermal expansion and the heat conductance of the fibers are very low. In addition, the amount of mass used in the combustion process is good.

Therefore, what is needed is an improved exhaust filter which provides an economic and porous substance which can be shaped or formed to provide a large amount of surface area, with a low thermal expansion and heat conductance, in a filter which can withstand high levels of heat and vibration.

SUMMARY OF THE INVENTION

Accordingly, the present invention is directed to an improved ceramic exhaust filter that substantially overcomes one or more of the problems of prior filters due to their limitations and disadvantages.

The present invention provides an improved exhaust filter with low thermal expansion and heat conductance, a high level of surface area on to which particulates might adhere, employing a low density compound which can withstand high heat—all of which result in a filter which can be shaped or extruded into a multitude of shapes and designs for highly efficient physical filtering and catalytic conversion of the harmful byproducts found in engine exhausts.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one aspect of the present invention there is provided an engine exhaust filter element comprising: a filter foundation of comprising a plurality of non-woven inorganic fibers; at least one zone formed within said filter foundation; and at least one area enhancement applied to an interior portion of said filter foundation. The plurality of non-woven inorganic fibers may include alumina-boria-silica fibers. The plurality of non-woven inorganic fibers may include alumina-zirconia fibers. The plurality of non-woven inorganic fibers may include alumina-oxide fibers. The plurality of non-woven inorganic fibers may include silica-oxide fibers. The engine exhaust filter element may have a coating or catalyst applied to an exterior surface of said engine exhaust filter element. The catalyst may be platinum, palladium, or rhodium based. The engine exhaust filter element may include one or more than one heating elements. The heating element(s) may be integrated within said filter foundation or applied externally to said filter foundation. The filter element may be comprise a plurality of zones each with a different density. The filter element may have at least one area enhancement and the surface area enhancement may be a microscopic enhancement. The microscopic enhancement may be in the form of a plurality of nano-tubes within said filter foundation. The filter element may be wrapped in at least one layer of insulation and contained within a casing.

In another aspect of the present invention there is provided a method of making an engine exhaust filter element comprising the steps of: mixing a plurality of inorganic non-woven fibers with a colloidal solution to form at least one slurry solution; vacuuming said at least one slurry solution into a mold to form a fiber block; curing said fiber block; machining said fiber block into a filter foundation; and applying a microscopic enhancement to an interior portion of said filter foundation. Additional steps may include applying a coating to an exterior surface of said filter element and/or applying a catalyst to said filter element. Heating elements may be inserted or applied to the filter element. The fiber blank may be formed in an oxygen free chamber and may be exposed to hydrogen or nitrogen during the fiber blank formation. Making the filter element may include the step of applying a binder to the slurry recipe; curing the fiber blank at a temperature above 500 degrees Celsius and curing the fiber blank at a temperature of about 1000 degrees Celsius. The method may include the step of quenching the blank after curing. Additionally, surface area enhancements may be formed on or within the filter element including microscopic enhancement. Additional steps may include piercing said interior portion of said filter foundation to form said at least one area enhancement or drilling an interior portion of said filter foundation to form said at least one area enhancement.

In another aspect of the present invention there is provided an engine exhaust filter system comprising: a casing having an inlet end and an outlet end for connecting to an engine exhaust; a filtering element contained within said casing with a filter foundation comprising a plurality of non-woven inorganic fibers; at least one zone formed within said filter foundation; and at least one area enhancement applied to an interior portion of said filter foundation. The engine exhaust filter system may comprising a plurality of non-woven inorganic fibers including alumina-boria-silica fibers, alumina-zirconia fibers, alumina-oxide fibers, or silica-oxide fibers. The engine exhaust filter system may comprise one or more coatings or catalysts applied to an exterior surface of the engine exhaust filter element. The catalyst may be platinum, palladium, or rhodium based. The engine exhaust filter system may include at least one heating element which is integrated within the filter foundation or attached externally. The filter element may comprise more than one zone each with a different density and may have a surface area enhancement applied to the filter element. The surface area enhancement may be microscopic and may be a plurality of nano-tubes within the filter foundation. The filter element may be wrapped in at least one layer of insulation. The filter element and or filter system device may be used on a diesel or gasoline driven engine.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
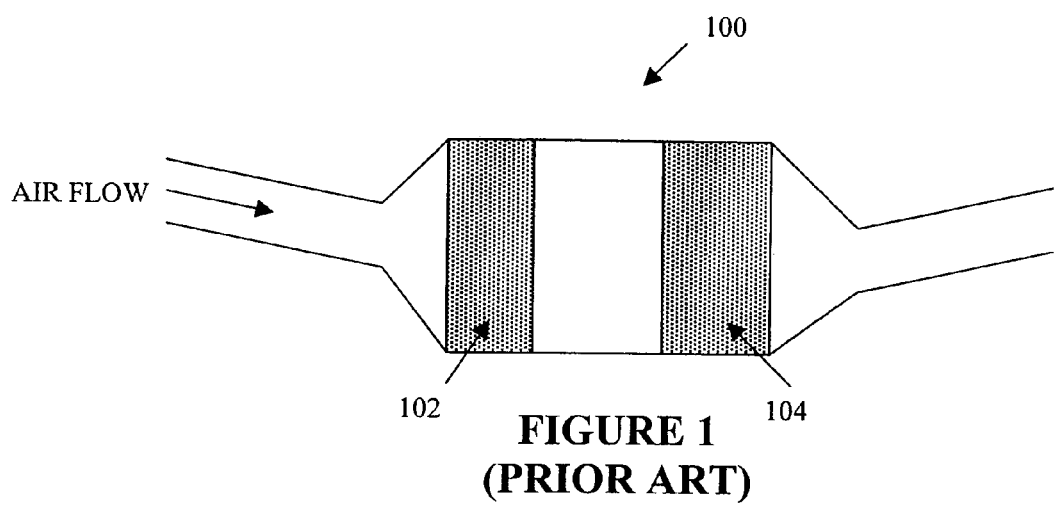
FIG. 1 is a longitudinal cross-sectional view of a typical catalytic converter.

Reference will now be made in detail to the preferred embodiments of the present invention, examples of which are illustrated in the accompanying drawings.

The present invention relates to an exhaust emission system for engines and is particularly useful for diesel engines. The present invention provides an exhaust emission system which can be described as a new third category of catalytic converters which utilizes features of previous catalytic converters and improves upon such features. The present inventions uses features from both the conventional catalytic converter and the inorganic fiber cartridges while improving their limitations, expanding their capabilities, and providing new performance opportunities.

Rather than extruding a ceramic or wrapping a yarn or fabric around a perforated tube, the foundation for the filter of the present invention is made by a common sol-gel process. This is accomplished by first pulling (via a vacuum or gravity-drawn) a well-mixed sol of inorganic fibers and colloidal solution into a filter mold which creates the sol-blank or blank.

In a preferred embodiment, the components of the inorganic fibers will consist of the three ingredients including Fibrous Glass, Alumina Fiber, and Alumino Borosilicate Fiber. The Fibrous Glass will comprise approximately 50-90 (%) percent of the inorganic fiber mix, the Alumina Fiber will comprise approximately 5-50 (%) percent of the inorganic fiber, and the Alumino Borosilicate Fiber will comprise approximately 10-25 (%) percent of the inorganic fiber mix. The inorganic fiber mix and blank has a melting point of approximately 3632 degrees Fahrenheit.

The filter mold can be in any form such as a cylinder, block, pyramid, sphere, free form, or any other symmetrical or asymmetrical shape that can be imagined. It should also be noted that the density of the sol-blank could be chemically and physically altered, if desired, during this process.

Injecting or mixing multiple (two or more) slurry recipes, and varying the vacuum rate of pull (a plurality of times) provides a blank with some areas denser then others and/or areas with different physical properties due chemical changes. By using different slurry recipes and molding techniques the blanks can be layered. In addition, the blank is not restricted only to parallel planar layers, such as layers on a cake, but the blanks can be formed with horizontal, angled, spherical, pyramidal, and free-form layers to name a few.

The filter blanks can also be formed by placing one or a plurality of previously made sol-blanks of different densities or chemistry, in any location within the mold and in any configuration that are cured or uncured, inside or within another sol-blank. These cores can be manually placed into the sol-blank or injected into the core. The result is a core or a plurality of cores of less or more density. The shape or form of these cores and blanks is unlimited as is the combination of layering the cores. This could create cores within core within cores, and so on. The process can be repeated an unlimited number of times as needed yielding a unique number of combinations of blanks in unlimited shapes.

Therefore, not only can the blanks vary in shape and size they can also vary in density, layering, combined with other blanks and an unlimited number of combinations. By varying the slurry recipes or vacuum during molding the blanks can have graduated or different layers or cores with different chemical compositions and densities. The blanks can have one or a plurality of zones each with a unique shape, location and physical properties as needed. The zones can change as needed for changing the strength, heat or electrical conductivity, catalyst adhesion capability, thermal expansion, vibrational and thermal shock, weight, porosity and permeability, sound dampening, or any other preferable property. The combinations are unlimited, as compared with the limitations of today's existing technology.

Once the sol-blank is formed or molded, it is then oven-dried long enough to drive off any water it may contain. The dried blank is then soaked in a sol-gel binder, preferably an alumina sol-gel binder, for a few days at various temperatures as the blank "wicks" (soaks up) the binder solution into the blank. The soaked blank is then placed into a chamber (large plastic bag) filled with ammonia gas. Nitrogen and hydrogen gas may also be introduced with the ammonia gas. In fact, any gas may be introduced as long as a reducing and oxygen free environment is maintained. Preferably, the gas is provided at a constant flow until the soaked sol-blank has formed into a gel-blank. At that point the gas is turned off and the gel-blank is exposed to the open air, allowing the gases to escape.

The gel-blank is then heat cured at a moderate to low temperature in an open-air oven to drive off some of the remaining liquids. Next, the gel-blank is heat cured at a higher temperature and the temperature is incrementally increased over several hours until the desired temperature is reached. After achieving and maintaining the maximum temperature, the gel-blank is quickly quenched. The end result is a rigid inorganic fiber blank. Once again, the process of heat curing the blanks can vary in the temperatures used, length of time to cure, the temperature and time of quenching, the temperature incremental increases, and the incremental temperature increase timing can all vary and provide another way to change the density, and other physical properties listed above.

Although the composition of the blank is very resilient to chemical, heat, thermal and vibrational shock, the hardness, is very low. This low hardness permits machining with little or a minimal amount of resistance or wear on tools. Despite the fact that the final blank has a low hardness or is soft, it is very durable. On a Moh's hardness scale, the blank is usually between 0.5 and 1.0 (or 1-22 on the Knoop hardness scale)—with talc being the softest at 1 (1-22 Knoop hardness) and diamond being hardest at 10 (8,000-8,500 Knoop). For example, silicon carbide has a Moh's hardness of 8.5 (or 2,000 Knoop). Because the blank material is very soft, it is easy to machine, sculpt, or shape. In relation to other known substances, the blank is as soft and effortless to machine or sculpt as Styrofoam or Balsa wood. The blank in the form of a crude block can be easily cut or sawn into a preformed shape, and then sanded, turned or machined into the final desired shaped preform. With little effort the preform can be shaped, sanded, turned, or machined providing unlimited shaping capabilities. The machining can range from turning a cylinder on a lathe, sawing to shape with a keyhole saw, band saw or jigsaw, sanding to shape or smoothing the surface, or any other method of machining commonly used on other solid materials. The blank and preform can be machined down to very exacting tolerances with the same accuracy as machining metals, woods or plastics. The machinability of the outside of blank and re-machining of the foundation is unlimited in possibilities.

The inside of the blank is just as easy to machine. The insertion of exhaust entry and exit tubes is as easy as piercing the blank with a rod. The piercing process requires minimal force and represents substantial cost savings over conventional preparation technology. It is as simple as pushing your pencil though a Styrofoam cup. The tubes can be drilled with a drill press, water drilled, air drilled or by any other method. The diameter of the tubes can be microscopic, and even below a nanometer (one millionth of a meter) if necessary. Since the tubes can be pierced, the shape of the tubes is not limited to parallel tubes. The tubes can be conical or even asymmetrical. In addition, the tubes are not limited to being linear. The tubes can be helical, curved, angular, or even irregular and varying in direction, orientation and/or diameter within each tube. The tubes could be hourglass shaped when cut with lasers. The tube configuration is only limited to the technology carving the tube.

Currently the preferred method of drilling or creating surface enhancements is to employ the use of a pulsating laser that can cut as many as 2000 holes per second in diameters smaller than the particulate if needed. Another accurate method for drilling tubes or creating surface enhancements is CNC (computer number control) drilling which is common among machine shops. CNC drilling is much slower and is not as economically feasible in mass manufacturing environments where thousands of filters per day are required to be made. The laser drilling may employ various laser or advanced drilling technologies including: diode-pumped solid-state laser drilling (DPSSL); chemical lasers (like $CO_2$); Electron Beam Drilling (EB Drilling); or Electrode Drilling Machines (EDM).

The exterior surface of the foundation can also be hardened by brushing, dipping, or spraying on a liquid hardening solution of any combination of the above-mentioned inorganic fibers with cordierite or mullite or any other combination of powders to protect the foundation from violent external impacts. Preferably, the exterior coat is then heat cured.

Once the foundation has been shaped to its final dimensions one or more catalysts may be applied using known techniques and methods such as the manner of applying the palladium-platinum based catalyst disclosed in U.S. Pat. Nos. 5,244,852 and 5,272,125 (the teachings of both of which are incorporated herein by reference in their entirety). In addition, the catalysts are not restricted to noble metals, combinations of noble metals, or only to oxidation catalysts. Any catalyst coating can be applied. Throughout the truck and automotive manufacturing industry companies are employing varying combinations and formulations of catalysts. Manufacturers such as Ford, GM, Toyota, have a unique catalyst formula for each vehicle. This is because each vehicle has numerous weight and engine performance demands. Manufacturers also have different catalyst formulas for the same vehicle depending upon where the vehicle will be sold or licensed (i.e. Canada, United States, California, Mexico). For this reason most manufacturers handle application of the catalytic coatings themselves.

Additional coatings (not catalysts) can also be applied. These additional or auxiliary coatings or veneers can be applied with brushing, spraying, wicking, or any other common method. The coatings, veneers, or washcoats aid in the catalyst adhesion.

Additionally, some catalysts may have the ability to be used as a heating source. However, most noble metal-based catalytic coatings are not continuous and are more similar to chunks or pieces of a catalyst which are applied to the surface. In order to conduct an electrical current throughout the catalyst a modified version of the catalyst or additional coating or catalyst would be required. The modified catalyst would likely include or have added a second metal which when applied forms a thin film to allow an electrical current to pass through enabling the catalyst to act as a heating source.

Figure 4:
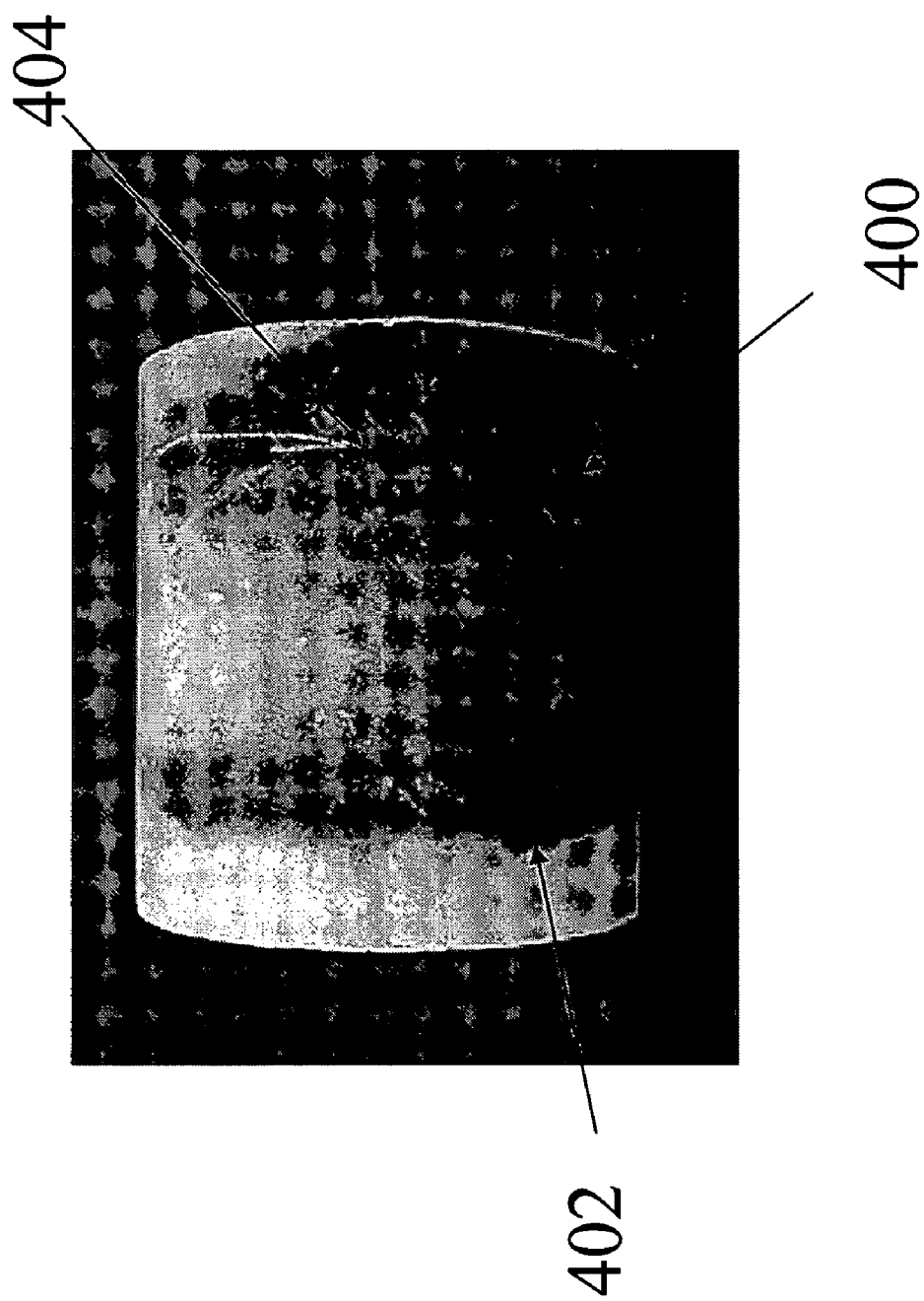
FIG. 4 is longitudinal view of an exhaust filter of the present invention.

As seen in FIG. 4, a filter foundation 400 of the present invention is shown. The filter foundation 400 has a hard coating 404 on the outside wall 402. For the sample depicted in FIG. 4, the hard coating consists of finely crushed cordierite and inorganic fibers. A powder was also painted on the filter foundation 400 and cured in a typical sol-gel fashion as previously described. The hard coating protects and insulates the filter foundation while not changing the dimensions.

Figure 2:
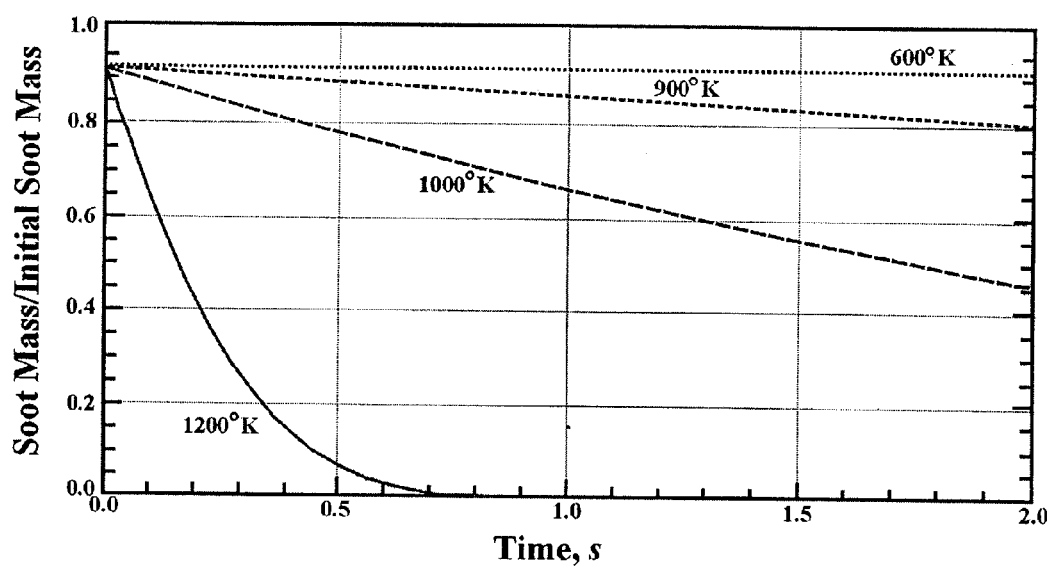
FIG. 2 is a graphical display of the residence time required to burn particulate matter at varying temperatures.
Figure 3:
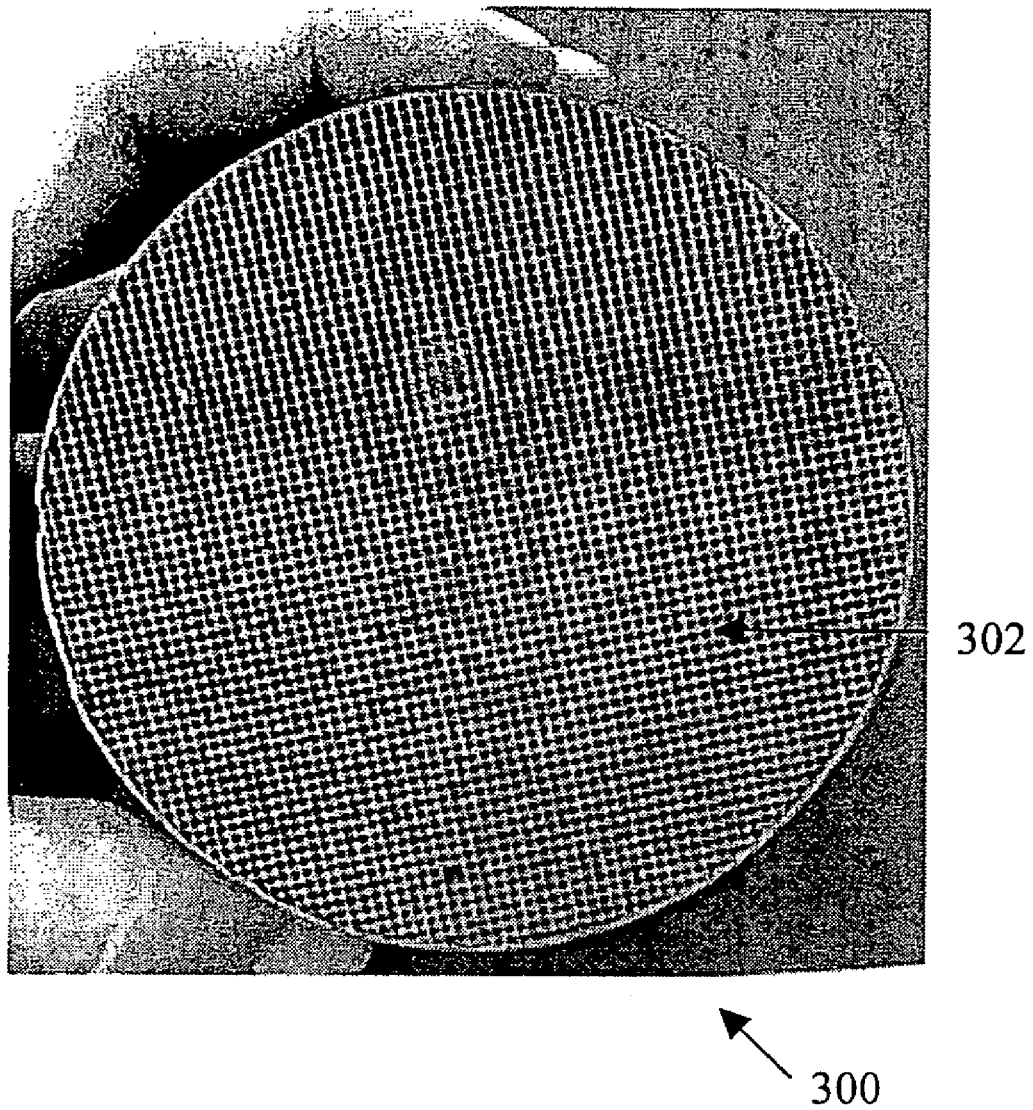
FIG. 3 is cross-sectional view of a typical ceramic exhaust filter incorporating a honeycomb structure.

An auxiliary heating element may also be applied to the filter foundation or exhaust filtration system. As previously discussed in conjunction with FIG. 2, higher temperatures reduce the residence time or time required to combust trapped particulates. Being able to burn or "flash off" trapped particulates faster provides a cleaner and more efficient filter which is less susceptible to clogging and melting. Although conventional or known filter elements have known (melting) temperature limitations which prevent or limit the use of auxiliary heating the filter element of the present invention have a much higher melting point (3632° F. or 2000° C.). which allows high temperature heating elements to be employed. Therefore, inserting an auxiliary heating element into the filer element can provide increased heat which results in faster burning or "flashing off" of the trapped particulates which results in a more efficient filter which is less likely to clog.

Adding or inserting an auxiliary heating element to the filter element of the present invention is an uncomplicated process due to the low hardness of the foundation. The auxiliary heating element can be pushed into the foundation or a hole can be cut to securely place or position the element within the filter element. The auxiliary heating element may also be added during the creation of the fiber blank. The auxiliary heater may also be added to the foundation before or after the catalytic coating is applied.

If an auxiliary heating source is utilized, an electrical energy source would most likely be required. A control mechanism could be used to automate the activation of the heater. The control mechanism could be triggered by changes in thermal (too cold to combust) and barometric (backpressure buildup from clogging) conditions of the gas flow ingress side of the filtering mechanism. Once both conditions achieve the optimum combustion temperature range the control mechanism will either turn down or stop the electrical flow to the heater thereby conserving energy and wear on the heater itself. The control mechanism can be either mechanical or electronic in configuration.

On the outside of the foundation, but not in the path of the ingress or egress of the gas flow, an insulation layer called batting may be added. The batting performs two functions. The first function of the batting is to provide a layer of insulation that protects the environment external to the foundation from being damaged by the possible extremely high internal temperatures that may attempt to radiate outward. The second function of the batting is to provide protection from any violent external vibrational shock transferred from the hard casing and accompanying filtration assemblies into the relatively soft foundation. The batting will also provide some heat reflection back in to the foundation portion of the filter. The batting can be made of any combination of inorganic fibers configured such as woven fabric, mat, or any other common configuration that will remain static once installed yet remains soft and flexible enough to protect and insulate.

The foundation, coated or uncoated, auxiliary heater if needed, and batting are securely installed in a durable casing. The casing should be comprised of openings that provide ingress and egress for exhaust gas. Except for the two openings the casing preferably should have an airtight seal. The openings are configured in such a manner as to securely attach to an existing exhaust system while providing an airtight connection. Once attached properly, all of the engine exhaust is forced through the foundation portion of the filter. If the filter is placed within a modified exhaust manifold the casing may actually be the exhaust manifold.

The filter assembly is flexible in functionality in that it can be modularly adapted to the full range of engines including diesel engines. This includes, but is not exclusive of or limited to; engines on cars, trucks and buses, locomotives, commercial and recreational marine vessels, non-road applications, tractors, agricultural power sources, construction, and auxiliary power sources.

Figure 5:
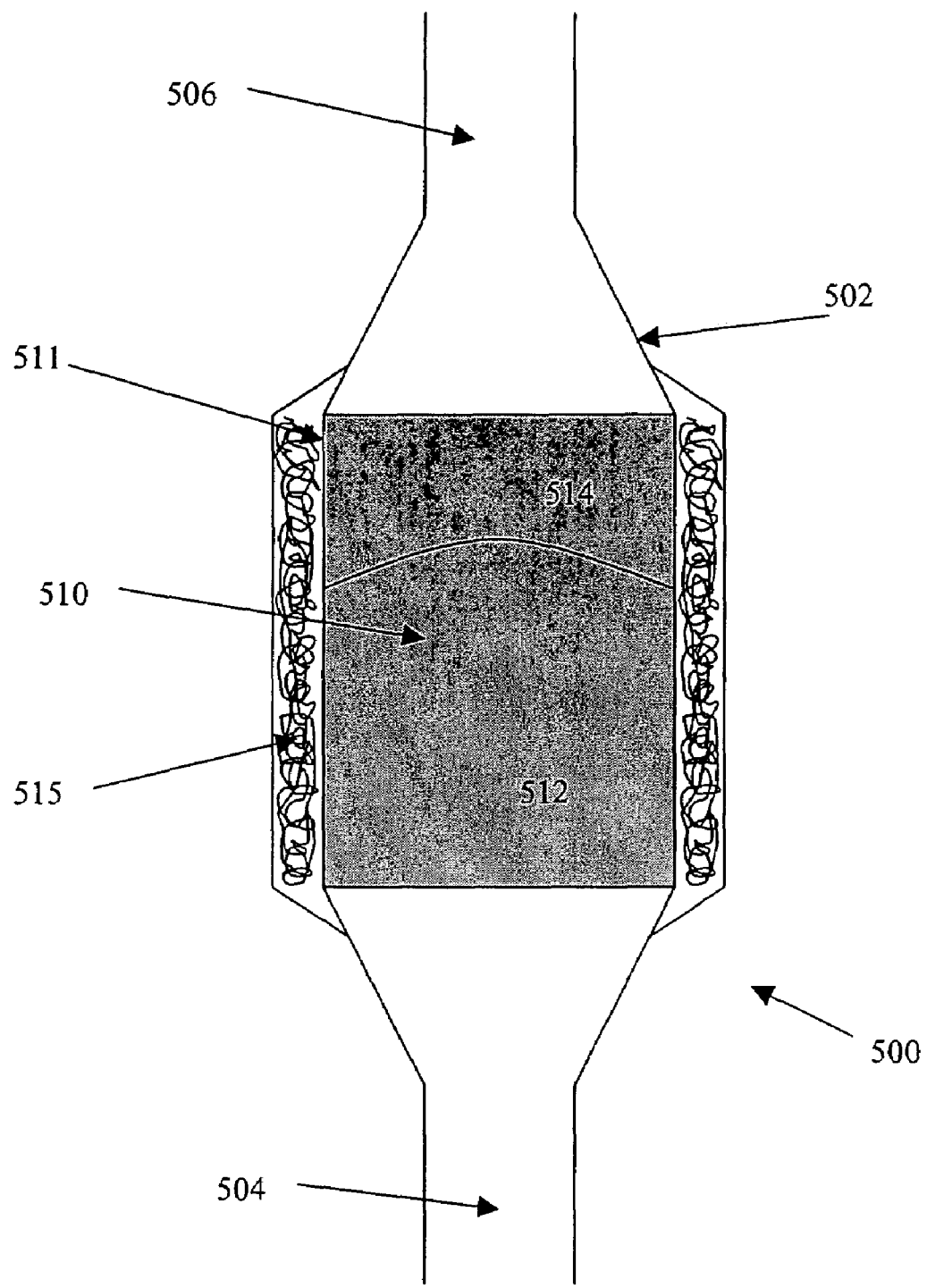
FIG. 5 is a cross sectional view of the improved exhaust filter system of the present invention.

As seen in FIG. 5, the present invention provides an improved exhaust emissions filtration system 500. The filtration system may be comprised of a durable and heat resistant casing 502. The casing 502 will have an intake 504 and an exhaust port 506. The improved filter 510 may have one or a plurality of zones 512, 514. The improved filter 510 may be wrapped or enclosed in one or more layers of batting/insulation 515. The batting layer 515 may be applied to the filter foundation 510 to shield the foundation 510 from engine and mobile environment vibrational shock as well as to insulate the exterior environment from internal thermal temperatures of the filter foundation 510.

An auxiliary heating source, if desired, may be included as a means of providing the coated foundation additional heat that can be either internal or external to the filter foundation. The auxiliary heating source may require a power source and a means of regulating the power source.

The filter 510 is derived from a massive blank created by forming a rigid configuration of chopped and/or non-woven inorganic fiber and a binding agent. The fiber blank is machined or worked into the desired external dimensions for the filter foundation 510. The interior of the filter foundation is then machined or worked to provide the desired surface area enhancement configuration. A durable inorganic hardened coating 511 may be applied to the filter foundation 510 by brushing, spraying, dipping, or any other common application method. In addition, the fiber foundation 510 may include an oxidation or reduction catalyst applied by brushing, spraying, dipping, or any other common application method.

The filter foundation 510 and the applied coatings 511, catalyst, batting 515, and any heating elements can be incorporated or enclosed within the durable and heat resistant casing 502 capable of protecting the exhaust filtration system 500 from physical damage of the external environment. The casing ends 504, 506 can attach to or reside in an engine exhaust pipe, manifold or engine block. The system of the present invention may also employ a means, such as an auxiliary fan, for forcing the exhaust gas through the coated foundation and heating source.

The present invention provides an emission exhaust system for removing particulate matter and gaseous pollutants from the internal combustion exhaust gas stream. As previously stated, the filter foundation is machined or formed from an inorganic fiber blank. The fiber blank is primarily composed of unique low density inorganic fibers which may include or comprise chopped fibers. The chopped fibers may be uniform in length, random lengths, short fibers, long fibers, one kind of fiber, a plurality of different kinds of fibers and any combination. The low- density inorganic fibers may comprise non-woven or chopped inorganic fibers in any composition. The inorganic fibers may be comprised of comprise one or more of the following (but not limited to): (1) alumina-boria-silica; (2) alumina-zirconia; (3) alumina-oxide; or (4) silica-oxide. The inorganic fibers may contain secondary enhancing trace elements, constituents, or acceptable impurities. The trace elements may be any of a combination of Cu, Mg, Mn, La, Ce, Zn, Zr, Ce, and La. Trace elements have shown to be more efficient in the catalytic action for the adhesion of the catalysts when it is applied, the dispersion and nature or evenness of the catalysts when it is applied, and in the tensile strength of the filter foundation.

As previously indicated, the emission exhaust system or the filter foundation itself may have an external heating source applied which is used to heat up the filter foundation. The filter foundation may also have an oxidation catalyst supplied which is used to expedite the remediation process.

The inorganic fiber blank is formed using a modified sol-gel process which is a common chemical engineering or ceramic process. The inorganic fiber blank may also utilize a "squeeze-cast" pressurizing process where pressure is reduced to negative value or a vacuum process. The vacuum process allows the inorganic fiber blank to be formed or produced with super low densities while maintaining its strength. The sol-gel process in conjunction with the pressurized process or vacuum process used in the formation of the inorganic fiber blank helps to produce exceptionally low densities which is extremely beneficial to the filtration of particulates.

The inorganic fiber blank may be formed in a chamber utilizing an oxygen free atmosphere during the pressurizing phase. The oxygen-free atmosphere creates an environment which minimizes metal oxidation and uniquely strengthens the fiber bonds. The additional exposure or use of nitrogen or hydrogen gas may be used to achieve super low densities. Hydrogen gas is volatile which makes nitrogen the preferred gas. The inorganic fiber blank may also utilize a single or multiple binder process to vary the strength and conductivity of the blank. Applying a binder several times will increase the strength but may also reduce or plug up the pore spaces. The binder may be an oxide binder with an $SiO_2$ or an $Al_2O_3$ composition which are the most common binders for this sol-gel process. The oxide binder may also be a glass configuration, a crystalline configuration, or some other inorganic binder. The inorganic fiber blank may be cured any where at or about 500 degrees C. In a preferred embodiment, after gelling the binder, the inorganic fiber blank is cured by heating the blank to about 200° F. for about four hours, and then slowly increasing the temperature to about 600° F. over a five-hour period. After the heating the fiber blank is quenched by rapidly reducing the temperature.

The curing process has many variables and such variables can be adjusted according to how strong, how porous, or how permeable you want the fiber blank. The curing process can also be varied to determine how resistant the blank is to high temperatures. The curing process can use a plurality of curing applications and can vary the heating and cooling intervals and approaches. The inorganic fiber blank can also be rapidly cooled to quench or temper the inorganic fiber blank.

Once the fiber blank is cured it can be machined, drilled out, shaped, and/or configured as needed to create or form the filter foundation in the shape needed. Essentially, the inorganic fiber blank is machined down to a desired shape or size. Once the desired shape or size is achieved the filter foundation can have microscopic surface area enhancements applied. The microscopic surface area enhancements can be applied using such techniques as piercing or drilling holes of a pattern into the filter foundation. As previously discussed, current methods of drilling or creating surface enhancements include the use of a pulsating lasers, CNC drilling, DPSSL, EB Drilling, or EDM. Pulsating lasers can cut as many as 2000 holes per second in diameters smaller than the particulate if needed.

Figure 6:
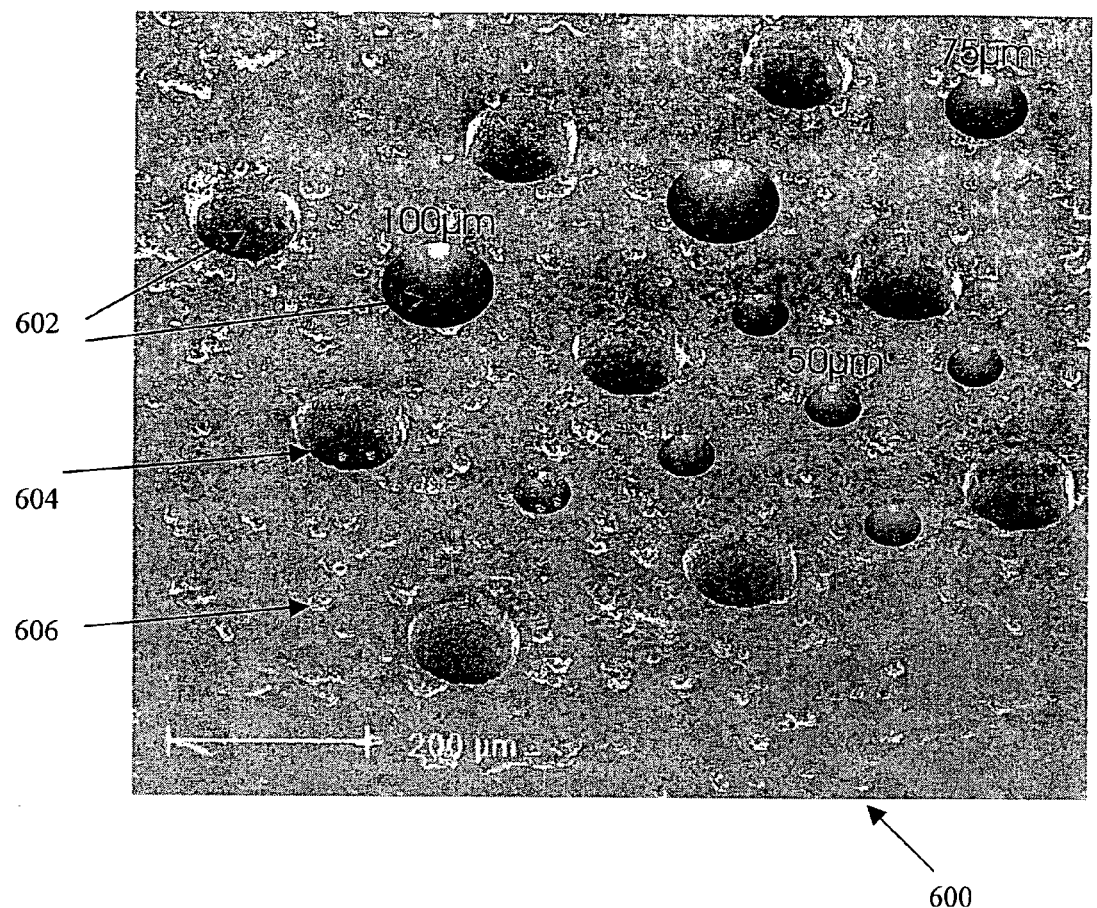
FIG. 6 is a cross-sectional longitudinal view of conical shaped entry and exit tubes which can be formed into the filter element of the present invention.

As seen in FIG. 6, these microscopic surface enhancements include incorporating microscopic entry and exit tubes such as nano-tubes, mµ-tubes, µ-tubes, nano-channels, mµ-Channels, µ-channels or the like. The size of the microscopic entry and exit tubes or channels is a factor of the drilling techniques used. The use of high end laser drilling devices will allow channels and tubes to be drilled in the preferred 50-100 µm diameter range. The microscopic surface enhancements will enable the filter element to treat the pollutants and particulates at a microscopic level which has not been achieved by conventional exhaust filters or catalytic converters. Treating the exhaust pollution and particulates at the microscopic level provides vastly increased light-off rates and filter regeneration it also greatly increases the percentage of particulates remediated.

The filter foundation may of comprise common exit and entry tubes cast during formation of the inorganic composite fiber blank. The entry and exit tubes may be created using organic spacers that are inserted within the uncured inorganic fiber blank for filter foundation. It is important to note that the exit tubes are not for pollution but are a means for intermediated gases to exit the filter, and maintain engine power or exhaust gas flow (indirectly). The entry and exit tubes may also be created during the curing phase where the inserted spacers decompose or dissolve during the curing process. The entering and exit tubes may also be created after formation of the filter foundation. In a preferred embodiment the entry and exit tubes are created after formation of the filter foundation. The entry and exit tubes may be drilled or pierced into the filter foundation and such tubes may be in a parallel or non-parallel configuration, a linear or non-linear configuration, may be cylindrical, conical, elliptical, curved, square, circular, hourglass, or any other imaginable shape.

Figure 7:
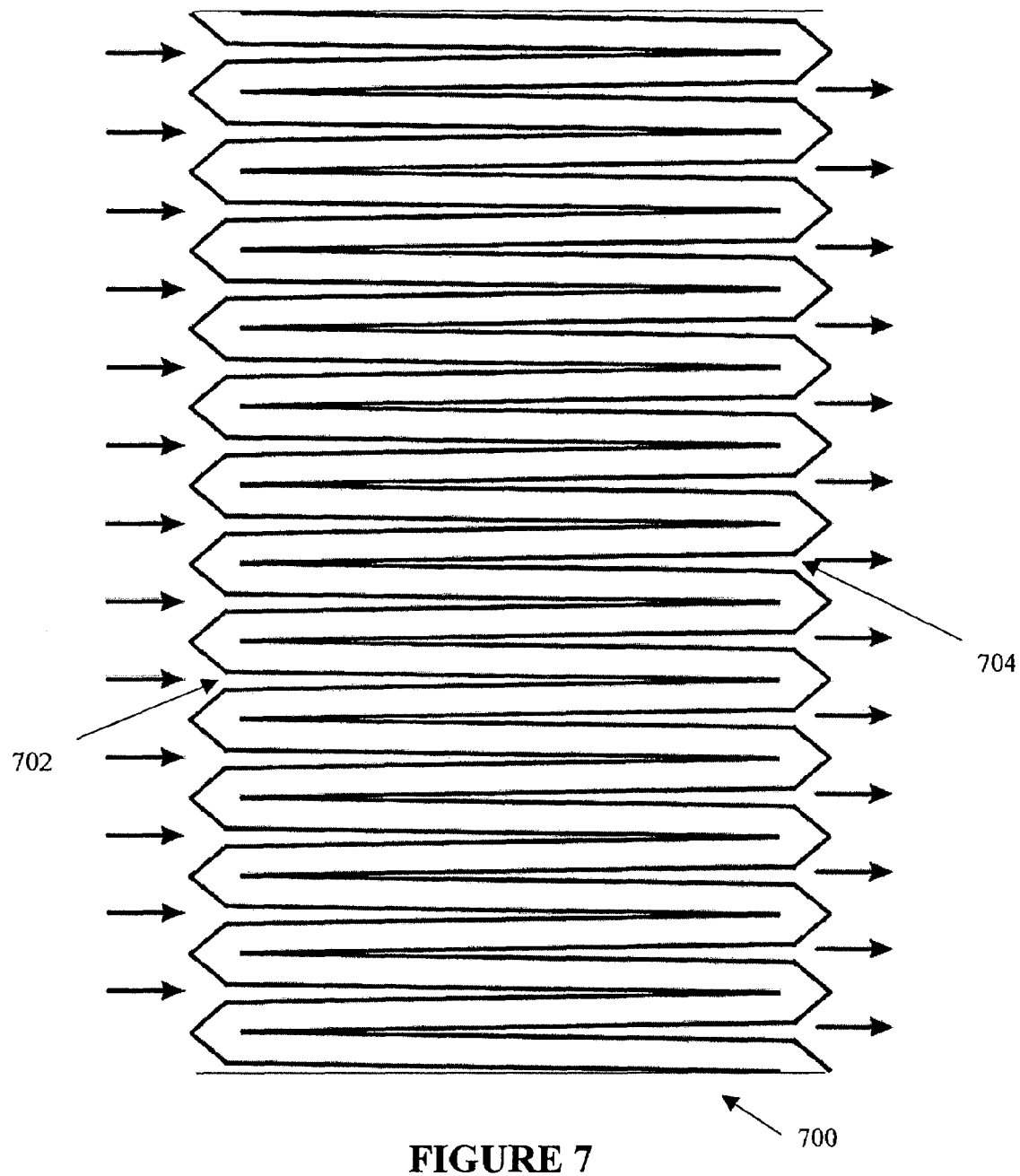
FIG. 7 is a microscopic view of the surface area enhancements and entry and exit tubes which can be formed in the filter element of the present invention.

FIG. 7 provides a longitudinal illustration of the entry 702 and exit 704 spaces which can be applied to the filter element 700. Evident from FIG. 7 is that all of the entry 702 and exit 704 spaces are parallel to one another and are conical in shape. The use of a conical design forces the exhaust gas and particulate to filter through the non-woven inorganic fiber filter element itself which results in a higher percentages of trapped particulates.

Provided below are two exemplary embodiments of the production and design of the filter elements of the present invention. The first example is ideally suited for use as an exhaust filter device for a diesel engine. The second example is ideally suited for use as an exhaust filter device for a gasoline engine.

EXAMPLE 1

Diesel Engine

Foundation: The foundation or fiber blank is created using an alumina-enhanced thermal barrier formulation. The alumina-enhanced formulation can be created in different densities and are differentiated by number. The numbers stand for the weight on one cubic foot of the material or "pcf." As an example, an 8 is considered low density and a 25 is considered high density. The alumina-enhanced formulation can vary in "pcf" range between 2 and 50, but preferably between 8 and 25 for the present invention. In this exemplary embodiment, the low density alumina-enhanced formulation is used as lower density provides more surface area to trap particulates.

The fiber blank is typically grown or formed in approximately 13"×13"×5" blocks. From the fiber blank a five inch tall cylinder which is six inches in diameter or an oval right-cylinder preform is cut from the blank using a diamond tipped or tungsten-carbide band saw. This preform is further machined to exact tolerances on a spinning lathe (for right circular cylinders) or on a belt sander forming the foundation. Since the foundation is soft the machining is as simple and easy as machining soft wood.

Tubes: Once the foundation is cut out from the fiber block and machined it is inserted into a drilling mechanism for drilling. Parallel to the major axis of the cylinder and the flow of exhaust emission a plurality of tubes are drilled into the foundation. The diameter sizes of the tubes drilled into the foundation can range. However, the smaller the tube diameter the more tubes you can fit into the foundation.

Since the size of most particulates of diesel engines are considered either PM10 or PM2.5 the tubes should be large enough for the particulates to enter but small enough that the particulates are likely to come into contact with and attach to the inner walls of the drilled tubes. In addition, the alumina-enhanced composite matrix ceramic is 90% porous, which means that there is a tremendous amount of room for gases to pass through the foundation. This large porosity also provides an additional surface area for the particulate to deposit onto.

For this diesel exemplary embodiment, the foundation is drilled with 0.04 inch diameter holes spaced every 0.06 inches across the entire filter. These tubes are smaller than conventional cordierite tubes and the result is vastly increased surface area without taking into consideration the surface area existing in the massive pore space of the alumina-enhanced composite matrix ceramic itself. As shown in FIG. 7, the tubes will incorporate parallel "blind" tubes or tubes with no exit hole. The blind tubes force the gases to pass through the pore space in the septum or filter element itself prior to exit.

In this exemplary embodiment the holes are drilled using a CNC drill which is computer controlled to maintain uniformity. The drilling process is performed under a constant water shower to prevent dust from becoming airborne, becoming an OSHA hazard, and/or getting into the bearings of the drill and destroying them. The drilled foundation is oven dried to drive or bake off any water or other liquid that may reside in the pore space before any catalytic applications. Baking time is not critical and complete evaporation of the water can be determined by simply weighing the foundation. After heating the filter element for several different intervals the weight will level off and the filter element or foundation is ready for any catalyst or coating application.

Catalyst: The drilled foundation is now ready for coating of the catalyst. Typically, the drilled foundation is sent to the truck manufacturer who then places the foundation in a proprietary solution of dissolved noble metal salts and then heat cures the filter element. The method and manner of applying a washcoat and catalysts is known to those skilled in the art and is disclosed in U.S. Pat. Nos. 5,244,852 and 5,272,125.

Canning: After all catalysts and coatings are applied the filter element is canned or encased in a housing. The filter element may be wrapped in an insulation or batting layer prior to encasing within the housing. The housing is usually made of metal. The exhaust filter system is then placed in a conventional location downstream of the exhaust manifold.

EXAMPLE 2

Gasoline Engine

Foundation: Once again, for this exemplary embodiment for a gasoline engine, the foundation is formed using the same alumina-enhanced thermal barrier formulation. The alumina-enhanced composite matrix ceramic "pcf" range can be between 2 and 50, but preferably between 8 and 25. In this exemplary gasoline engine embodiment, the low density alumina-enhanced composite matrix ceramic 8 is used as it provides a low density yet strong fiber blank.

Again, the fiber blank is typically grown in approximately 13"×13"×5" blocks from which a five inch tall cylinder which is six inches in diameter or an oval right-cylinder preform is cut. Cutting is performed using a diamond tipped or tungsten-carbide band saw and then the filter element is machined to exact tolerances on a spinning lathe or belt sander.

Tubes: Once the foundation is cut and sanded to final dimensions the tubes are cut or drilled into the filter element. For the exemplary embodiment for a gasoline engine the tubes or holes are cut using a Diode-Pulse Solid State Laser (DPSSL). The DPSSL allows surface area enhancement, tubes, or holes to be cut at a rate of 2,000 holes per minute. The resulting tubes have an approximate diameter of 100 nanometers or microns (thousandths of a millimeter). Since the surface area of the filter element has been vastly increased as a result of the hundreds of thousands of nano-tubes the filter does not need to as thick as conventional filters. In addition, the thinner or smaller filter elements of the present invention are less costly to produce because one fiber blank cut out can make multiple filter elements and requires a reduced amount of any coatings or catalysts applied.

In addition, because the alumina-enhanced composite matrix ceramic is 90% air, we have an incredible amount of pore space for the emission to pass through. This incredible amount of additional surface area adds to the already drilled tubes to provide a massive amount of surface area in a small space. As seen in FIG. 6, the Scanning Electron Microscope (SEM) images of the alumina-enhanced composite matrix ceramic filter element 600 displays how the pore space 606 diameter is very compatible with particulate matter 604. In order to make the tubes more efficient, the laser drilling can be programmed to drill a conical shaped or blind hole instead of a parallel cylinder. The lasers can even be programmed to go in small at the top and open up (like and hourglass) or move around to create non-parallel openings, random openings or passages, and staged or staggered patterns.

Additionally, the formation of a shorter filter element length will permit the exhaust to flow almost effortlessly. The length of travel through a filter builds up backpressure and the short filter element will backpressure will be diminished and the exhaust gas will move through the filter system with less effort all at increased filtering capabilities. This reduction in backpressure results in the engine running more efficiently meaning better gas mileage and more power.

Canning: Since the filter element itself has been reduced in size the housing can also be reduced in size and will mostly likely be noticeable as a small bulge in the exhaust pipe line. Or it can be a small container between the exhaust manifold and the tailpipe.

Location: The exhaust filter device in this exemplary gasoline engine embodiment is then installed at the end of the exhaust manifold to make the best use of the existing engine heat to assist in burning of the particulate. Although conventional catalytic converters composed of cordierite or silicon carbide will melt or spallate at this location the present invention will not. In this exemplary embodiment for a gasoline engine the exhaust filtration system will start with an untreated filter element located close to the exhaust manifold as possible to combust the particulate using the high temperatures of the exhaust. Further downstream, where the temperature is more favorable for most catalysts, a second and third stage filter can be added to convert NOx and other toxic gases into less harmful exhaust.

Figure 8:
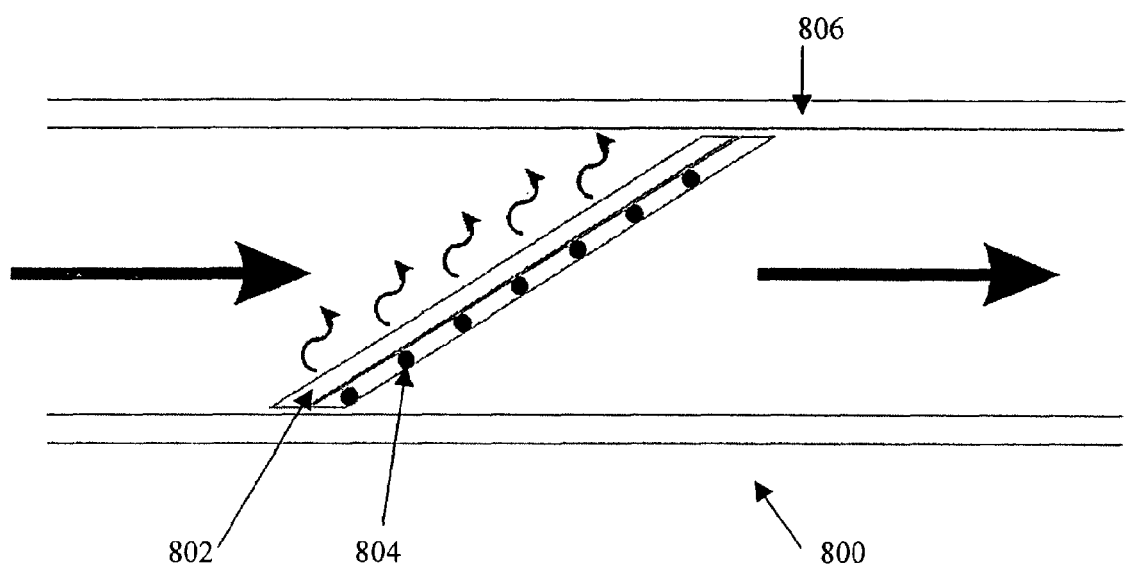
FIG. 8 is a cross-sectional view of an embodiment of the exhaust filter system of the present invention.
Figure 9:
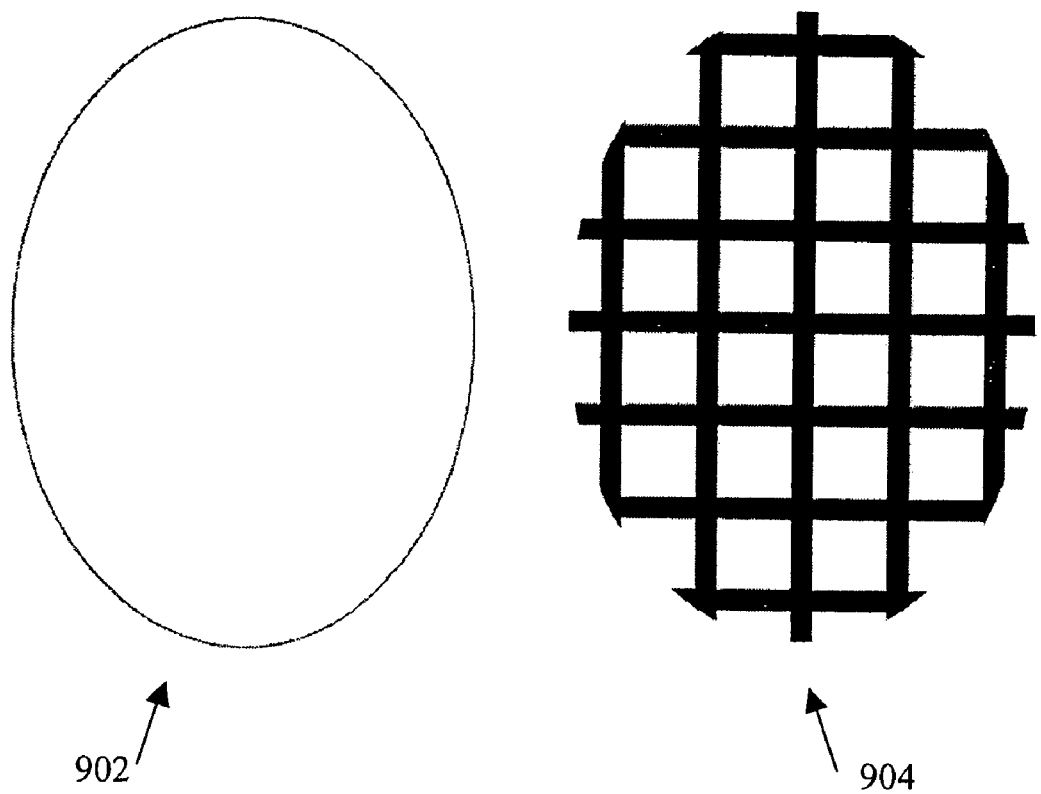
FIG. 9 is a frontal view of an embodiment of the exhaust filter system of the present invention.

The two exemplary embodiments discussed above are applications of the technology of the present invention using standard and customary canning shapes such that the filter element shape is similar to the standard filter shapes of conventional filters. However, as seen in FIGS. 8 and 9, the unique characteristics of the present invention allow the shape and design of the filter element to provide unique designs and solutions. As seen in FIG. 8, the exhaust filter system 800 includes a filter element 802 combined with a wire mesh heating element 804. The filter element 802 and wire mesh heating element 804 and inserted into the exhaust casing 806 at an angle compared to the exhaust flow. Since, the wire mesh heating element 804 is placed behind and below the filter element 802 as a result of the angle the filter element 802 can be heated more efficiently and uniformly taking advantage of the known principal that heat rises. As previously discussed, more uniform and efficient heating enables the filter element 802 to more completely combust or flash off the particulates resulting in cleaner exhaust. FIG. 9 displays a frontal view of the filter element 902 and wire mesh heating element 904 described and discussed in relation to FIG. 8. As can be seen the filter element 902 and wire mesh heating element 904 are oval shaped so as to fit in the casing at an angle. The shape of the casing, shape of the filter element 902, type of heating element 904 and angle can all be modified to fit the requirements and restrictions of the intended exhaust system application.

Auxiliary Heating Source

As another configuration or exemplary embodiment to those previously disclosed, the filter element could include the addition of a series of electric heating rods added to the foundation after the catalyst is applied. The heating elements are applied after the catalyst to prevent the curing process from harming any electrical contacts. The heating elements or rods are placed approximately ¼ inch apart from each edge or any distance that is desired. You could also use a wire mesh configuration, or other heating element described herein, that is placed perpendicular to the gas flow direction and installed during the formation of the fiber blank. The electrical contacts could be protected with Nextel fabric or something similar. The heating elements could be activated before an engine starts as a prewarmer and will remain in operation, either partially or in full operation, until the exhaust temperature exceed the temperatures achieved by auxiliary heating elements.

The use of auxiliary heating source applied to the filter foundation may be useful to increase the temperature inside of the filter foundation and/or to evenly distribute additional heat throughout the filter foundation making it more efficient. The auxiliary heat source may comprise resistant electric heating elements. The heating elements may have a rod configuration which can be inserted after filter foundation formation or during the sol-gel process. The filter foundation can have one or more electric heating elements applied and the heating elements can be heated simultaneously, independently, and in a cycled, patterned, or random series. The heating elements could be in the form of a wire mesh configuration which can be inserted during or after the filter foundation formation. The filter can employ the use of a single wire mesh or a plurality of wire mesh heating elements and those heating elements can be heated simultaneously or individually. Additionally, the mesh heating elements can be heated in a cycled, patterned or random series. The heating elements may also utilize rods, spirals or helical configurations inserted during or after formation. The filter foundation may incorporate one or more spiral or helical heating elements which may be heated simultaneously or independently including the use of a cycled, patterned or random series. Finally, the filter foundation may incorporate a combination of any of the heating elements previously described.

In addition to the resistant electrical heating elements described above the auxiliary heat source may also use infrared or microwave heat heating elements. The various heat sources may be implemented inside of the filter foundation itself or may be employed to heat the filter foundation as an exterior heating element. Once again, various heat sources may be applied independently or in combination with any of the other heating elements or sources.

The filter foundation will be encased in a casing with sufficient durability to protect the filter foundation from normal impacts encountered with vehicle transportation. Such a casing may include a common metal casing such as stainless steel, steel or another metal alloy. The material may also be non-metallic including ceramic-based casings. The filter foundation may be encapsulated in insulation or batting prior to being enclosed in the casing. The present invention may also incorporate a heat shield.

The entry and exit tubes of the filter foundation may be coated with an oxidation catalyst. The catalyst may make the radiation process quicker which results in the system as a whole treating the exhaust in a much faster time. The catalysts may be a noble metal catalysts including those which are platinum, palladium, or are rhodium based, as well as others. The catalyst may be applied directly to the filter foundation surface. Application of the catalyst may be sprayed on, applied by dipping the filter foundation into a solution or injected into the filter foundation itself. The use of an oxidation catalyst will promote the ignition of the particulate matter at a lower temperature. In addition, a catalyst can also be used as a supplemental heater within the filter foundation itself.

The exhaust filter system can be integrated with the engine exhaust path including integration inside the exhaust manifold of the engine itself. Because the filter foundation is so durable to heat and vibration it can be placed immediately next to an engine exhaust as it exits the engine block. The unique ability of the filter foundation to withstand high heat and increased vibrational stress allows the placement of the present invention much closer to the engine. The close placement provides advantage over conventional exhaust filters or catalytic converters which cannot withstand such high heat or vibrational stress.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. An exhaust filtering/catalyzing element comprising:
   a filter foundation comprising a low density composite of non-woven inorganic fibers;
   the low density composite of non-woven inorganic fibers having a rigid structure;
   the filter foundation further comprising a plurality of channels,
   wherein the channels accommodate a flow of exhaust gas; and
   wherein the composite is of sufficiently high porosity to allow exhaust gas to pass through the composite.

2. The exhaust element of claim 1, wherein the inorganic fibers are selected from a group consisting of alumina-boria-silica, alumina-zirconium alumina, silica, and combinations thereof 3. The exhaust element of claim 1, wherein the composite further comprises one or more trace elements selected from the group consisting of Cu, Mg, Mn, La, Ce, Zn, Zr, and combinations thereof.

4. The exhaust element of claim 1, wherein the composite further comprises one or more catalysts.

5. The exhaust element of claim 4, wherein the catalyst is selected from a group consisting of platinum, palladium, rhodium, and combinations thereof 6. The exhaust element of claim 1, further comprising a coating applied to the exhaust element.

7. The exhaust element of claim 6 wherein the coating is a strengthening coating.

8. The exhaust element of claim 1, further comprising at least one heating element.

9. The exhaust element of claim 1, wherein the porosity of the composite is at least about 90%.

10. The exhaust element of claim 1, wherein the density of the composite is about 2 to about 50 pcf.

11. The exhaust element of claim 1, wherein the exhaust element is used on a diesel engine.

12. The exhaust element of claim 1, wherein the exhaust element is used on a gasoline engine.

13. The exhaust element of claim 1, wherein the composite comprises one type of fiber.

14. The exhaust element of claim 1, wherein the composite comprises a plurality of fibers.

15. The exhaust element of claim 1, wherein the composite comprises fibers that are approximately uniform in length.

16. The exhaust element of claim 1, wherein the composite comprises fibers of various lengths.

17. The exhaust element of claim 1, wherein the composite comprises one or more catalysts, wherein the filter foundation comprises a high internal surface area on which the one or more catalysts may catalyze the flow of exhaust gas, and wherein the high internal surface area contributes to the increase in catalytic activity of the one or more catalysts.

18. The exhaust element of claim 17, wherein the increased catalytic activity contributes to the reduction in the overall size of the exhaust element to a size sufficient to catalyze the flow of exhaust gas to an appropriate level.

19. The exhaust element of claim 1, wherein the filter foundation comprises a high internal surface area, and wherein the high internal surface area contributes to the reduction of backpressure across the exhaust element.

20. An engine exhaust filter/catalyzing system comprising:
a casing having an inlet end for connecting to an engine exhaust, and an outlet end;
a filtering/catalyzing element contained within the casing comprising a filter foundation comprising a low density composite of non-woven inorganic fibers;
the low density composite of non-woven inorganic fibers having a rigid structure;
the filter foundation further comprising a plurality of channels;
wherein the channels accommodate a flow of exhaust gas; and
wherein the composite is of sufficiently high porosity to allow exhaust gas to pass through the composite.

21. The exhaust system of claim 20, wherein the inorganic fibers are selected from a group consisting of alumina-boria-silica, alumina-zirconium, alumina, silica and combinations thereof.

22. The exhaust system of claim 20, wherein the composite further comprises one or more trace elements selected from a group consisting of Cu, Mg, Mn, La, Ce, Zn, and Zr.

23. The exhaust system of claim 20, wherein the composite further comprises one or more catalysts.

24. The exhaust system of claim 23, wherein the catalyst is selected from a group comprising platinum, palladium, rhodium, and combinations thereof.

25. The exhaust system of claim 20, further comprising a coating applied to the filtering/catalyzing element.

26. The exhaust system of claim 20, further comprising at least one heating element.

27. The exhaust system of claim 20, wherein the porosity of the composite is at least about 90%.

28. The exhaust system of claim 20, wherein the density of the composite is about 2 to about 50 pcf.

29. The exhaust system of claim 20, wherein the exhaust system is used on a diesel engine.

30. The exhaust system of claim 20, wherein the exhaust system is used on a gasoline engine.

* * * * *